United States Patent
Carlson et al.

(10) Patent No.: US 10,940,742 B2
(45) Date of Patent: Mar. 9, 2021

(54) LOCKABLE PIVOT LINK AND LOCK FOR PANORAMIC SUNROOFS

(71) Applicant: AISIN TECHNICAL CENTER OF AMERICA, INC, Northville, MI (US)

(72) Inventors: Erik Carlson, Northville, MI (US); Shintaro Katsura, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 43 days.

(21) Appl. No.: 16/356,287

(22) Filed: Mar. 18, 2019

(65) Prior Publication Data
US 2020/0298688 A1    Sep. 24, 2020

(51) Int. Cl.
*B60J 7/057* (2006.01)
*B60J 7/053* (2006.01)
*B60J 7/043* (2006.01)

(52) U.S. Cl.
CPC ............... *B60J 7/053* (2013.01); *B60J 7/043* (2013.01); *B60J 7/057* (2013.01)

(58) Field of Classification Search
CPC . B60J 7/043; B60J 7/0435; B60J 7/047; B60J 7/057; B60J 7/0573
USPC ............................... 296/216.02–216.05, 223
See application file for complete search history.

(56) References Cited

U.S. PATENT DOCUMENTS

| 5,058,947 | A | 10/1991 | Huyer |
| 8,182,029 | B2 | 5/2012 | Van Boxtel et al. |
| 8,567,859 | B2 | 10/2013 | Grimm et al. |
| 8,882,187 | B2 * | 11/2014 | Katsura ............... B60J 7/043 296/216.03 |
| 9,248,727 | B2 * | 2/2016 | Katsura ............... B60J 7/0573 |
| 9,511,653 | B2 * | 12/2016 | Ide ....................... B60J 7/0435 |
| 9,764,627 | B2 | 9/2017 | Vogel et al. |

FOREIGN PATENT DOCUMENTS

DE        33 11 452 A1    10/1983

* cited by examiner

*Primary Examiner* — Dennis H Pedder
(74) *Attorney, Agent, or Firm* — Oblon, McClelland, Maier & Neustadt, L.L.P.

(57) ABSTRACT

An apparatus and method for a sunroof of a vehicle, including a pivot link pivotally coupled to a drive shoe, the pivot link having a first pivot pin configured to slide along a first guide channel of a guide block to control tilting of a movable panel as the drive shoe slides, a lift guide, and a check assembly including a mechanical lock. The mechanical lock includes an inner surface having a locking guide channel to guide a second pivot pin of the pivot link, the locking guide channel includes an upper guide portion. The pivot link is configured to pivot to a raised position to tilt the movable panel when the drive shoe is slid in the forward direction and becomes coupled to the lift guide by the check assembly. The upper guide portion engages the second pivot pin to lock the pivot link in the raised position.

19 Claims, 16 Drawing Sheets

LOCKABLE PIVOT LINK AND LOCK FOR PANORAMIC SUNROOFS

BACKGROUND

Field of the Disclosure

The present disclosure is directed towards a tilt and outer slide apparatus for a vehicle sunroof, and in particular a lockable pivot link and lock for tilting the sunroof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Automotive vehicles may be provided with a sunroof in the roof of the passenger compartment. A sunroof assembly may include one or more glass panels in a window assembly. An opening mechanism may also be included, in which case at least one of the glass panels is movable. The movable glass panel opens and closes a substantially rectangular opening defined by a periphery of a housing. The housing is mounted to an opening in the vehicle roof. A panoramic sunroof is a sunroof that is large enough to extend over front and rear passengers in a vehicle. Panoramic sunroofs are found in sedans and sport utility vehicles that have a long roofline that can accommodate the large sunroof. A panoramic sunroof may have one large movable glass panel or may have two separate movable glass panels, one glass panel for the front and one glass panel for the rear passengers. Some panoramic sunroofs having a separate front glass panel may slide the front glass panel back over the rear glass panel. Some panoramic sunroofs have a front glass panel that is able to tilt.

In order to move a glass panel, some sunroof systems, referred to as tilt and outer slide sun roofs, tilt a glass panel so that a rear portion of the panel clears the roof line and then slide the tilted panel rearward to open a vehicle sunroof. In order to tilt the glass panel, the sunroof system performs a tilt-up stroke that includes pushing functional components rearward. Such tilt and outer slide sunroof systems have a tilt-up stroke that tilts the glass panel and moves functional components at a relatively fast speed as it is generally considered necessary to quickly open the sunroof. However, such sunroof systems with relatively fast tilt-up strokes have encountered situations where the sunroof motor stalls during sunroof operation when the vehicle with the sunroof is traveling at high speeds, e.g., highway speeds. In other words, such sunroof systems push functional components in a rearward direction during the tilt-up stroke, which may undergo intense forces during sunroof operation at the high speeds. In addition, such fast operating sunroof systems have been found to have a risk of pinching during various phases of operation.

In order to tilt a glass panel, the glass panel may be tilted by a pivot link that is rotated to raise a rearward portion of the glass panel to a tilted position. However, vibrations of the vehicle and forces on the sunroof while a vehicle is traveling at high speeds may result in a pivot link that slips to a lower position and fails to maintain the glass panel in a tilted position.

SUMMARY

The present disclosure relates to A tilt and slide apparatus for a sunroof of a vehicle, including a movable panel configured to open and close an opening formed at a roof of the vehicle; a receiver bracket affixed to the movable panel; a guide block having a first guide channel, the first guide channel extends in a length direction of the guide block; a drive shoe configured to slide in a forward and rearward direction of the vehicle; a pivot link pivotally coupled to the drive shoe, the pivot link having a first pivot pin configured to slide along the first guide channel of the guide block to control tilting of the movable panel as the drive shoe slides in the forward direction; a lift guide connected to an end of the movable panel for maintaining a position of the front of the receiver bracket; and a check assembly including a mechanical lock mounted to the lift guide. The mechanical lock includes an inner surface having a locking guide channel to guide a second pivot pin of the pivot link, the locking guide channel includes an upper guide portion. The pivot link is configured to pivot to a raised position to tilt the movable panel when the drive shoe is slid in the forward direction and becomes coupled to the lift guide by the check assembly, and the upper guide portion engages the second pivot pin to lock the pivot link in the raised position.

The present disclosure relates to a tilt and slide apparatus for a sunroof of a vehicle, the tilt and slide apparatus including a guide block having a first guide channel, the first guide channel extends in a length direction of the guide block, a drive shoe configured to slide, a pivot link pivotally coupled to the drive shoe, the pivot link having a first pivot pin and a second pivot pin opposite of the first pivot pin, a lift guide, and a check assembly including a mechanical lock mounted to the lift guide, the mechanical lock including an inner surface having a locking guide channel, the locking guide channel including an upper guide portion. The method includes sliding the drive shoe in the forward direction to the lift guide; sliding the pivot link via the first pivot pin along the first guide channel; guiding the second pivot pin along the locking guide channel; pivoting the pivot link to a raised position to tilt a movable panel; the check assembly coupling the drive shoe and the lift guide; and engaging the second pivot pin by the upper guide portion to lock the pivot link in the raised position.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
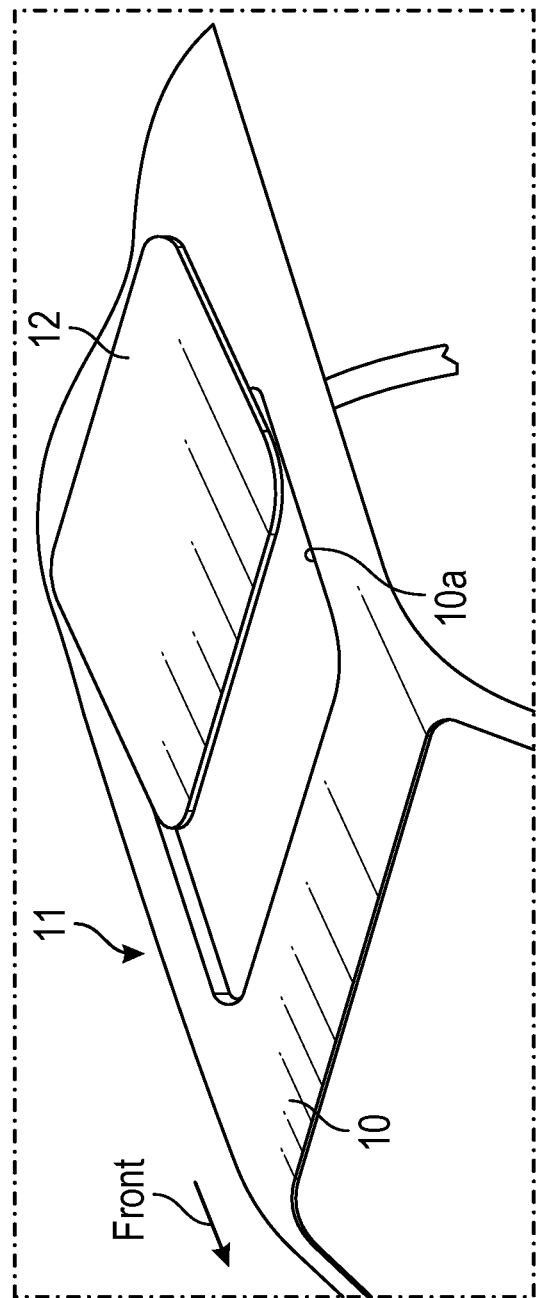
FIG. 1 is a perspective view of a roof in which a sunroof is mounted.

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Referring now to the drawings, wherein like reference numerals designate identical or corresponding parts throughout several views, the following description relates to a sunroof assembly for an automotive vehicle. As mentioned above, vehicles may be provided with sunroof assemblies having a movable panel that is tilted and slid while the vehicle is traveling at high speeds, e.g., highway speeds. The motor in such sunroof systems has been found to stall such that the sunroom becomes jammed when operated while the vehicle is traveling at high speeds. Disclosed are embodiments that provide a solution to this problem and other problems. In addition, the disclosed sunroof apparatus is provided as a simplified arrangement having fewer parts than other panoramic sunroof systems.

A panoramic sunroof apparatus of a vehicle roof 10 will be explained. As mentioned above, a panoramic sunroof is a sunroof that extends over a large portion of a vehicle roof to provide sunroof features for both front and rear passengers. A front/rear direction refers to a forward/rearward direction relative to a traveling direction of the vehicle having the roof 10. A right/left direction or a width direction refers to a direction of the vehicle relative to the front of the vehicle. An upward/downward direction refers to a direction relative to ground below the vehicle. An indication that a component or element is above or below relates to the upward/downward direction.

FIG. 1 is a perspective view of a vehicle roof with a sunroof apparatus for a vehicle according to an exemplary aspect of the disclosure. A substantially rectangular opening 10a is formed in a vehicle roof 10 of a vehicle such as an automobile. The opening 10a may have rounded corners. The sunroof apparatus 11 includes a movable panel 12 substantially in a rectangular form. Corners of the movable panel 12 may be rounded to match the shape of the opening 10a. The movable panel 12 may be made of glass, or a safety glass laminate. The movable panel 12 moves in the front/rear direction for opening and closing the opening 10a. Although the drawing shows a single movable panel, the sunroof apparatus may have more than movable panel. A movable panel may be in a forward position toward the front of the vehicle. However, the movable panel may be in a rearward position, or in a middle position of the sunroof apparatus.

Figure 2:
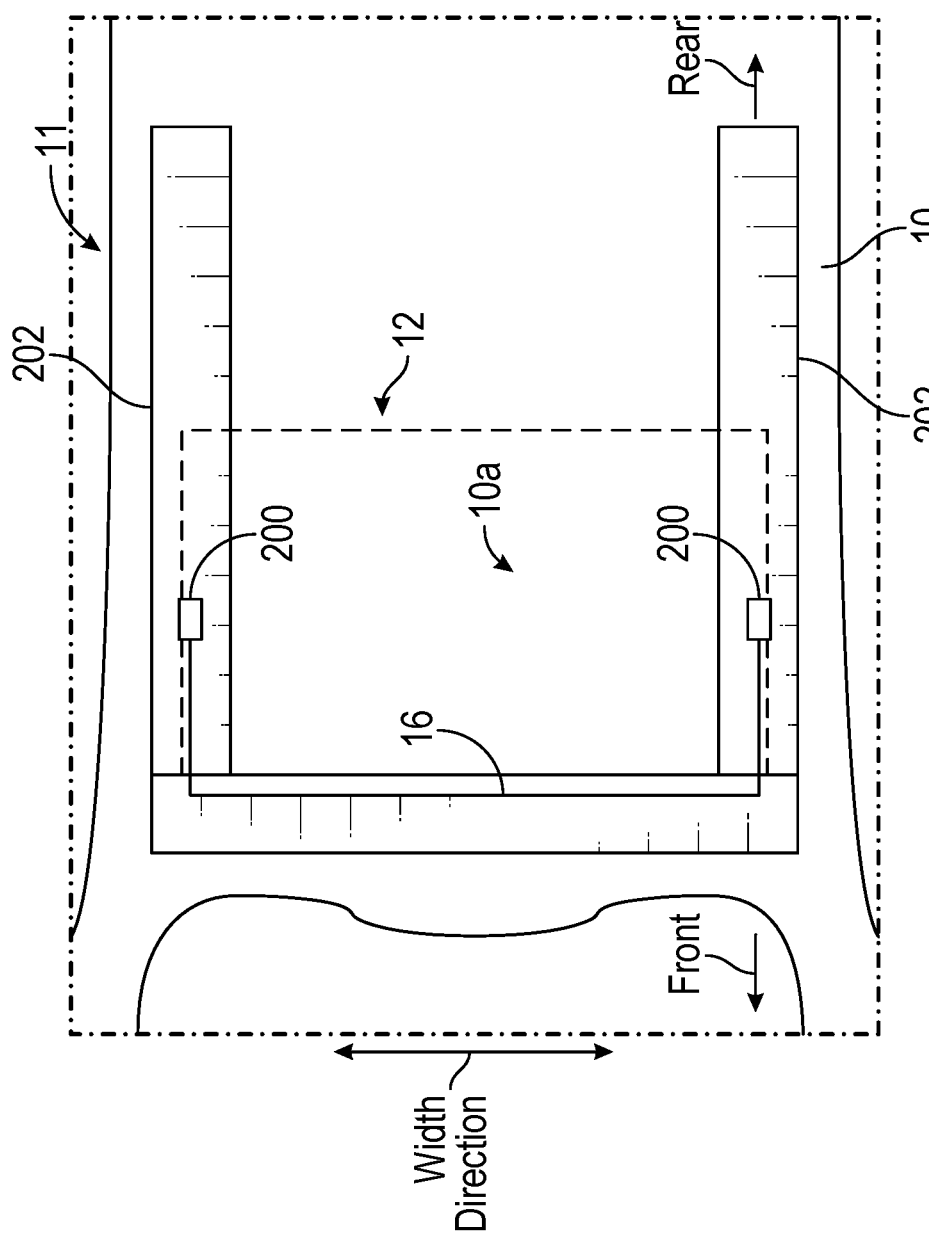
FIG. 2 is a plan view of a sunroof.

Regarding FIG. 2, the sunroof apparatus 11 includes a pair of guide rails 202 provided at opposed edge portions of the opening 10a relative to the vehicle width direction. Each of the guide rails 202 extend in the front/rear direction. The sunroof apparatus operates as a tilt and outer slide apparatus which utilizes various functional components. In particular, the functional components move in the front/rear direction along the guide rails 202 to tilt and slide the movable panel 12. The functional components are supported and guided relative to the guide rails 202. The movable panel 12 is mounted between the functional components so as to be connected to and supported by the functional components. The guide rails 202 may be made of metallic plate, which to save weight may be a plate made of aluminum alloy.

Respective front edges of the guide rails 202 are connected to each other by a front housing that extends in the vehicle width direction. An electric drive source such as an electric motor serving as a drive source and including an output gear, for example, may be provided at a substantially intermediate portion of the front housing in a longitudinal direction of the housing. The electric drive source is connected to functional components, including a drive shoe 200, via a pair of drive belts 16 made of resin material, for example, and substantially formed in a strap form so as to simultaneously move the functional components provided at the respective guide rails 202 in the front/rear direction.

Figure 3:
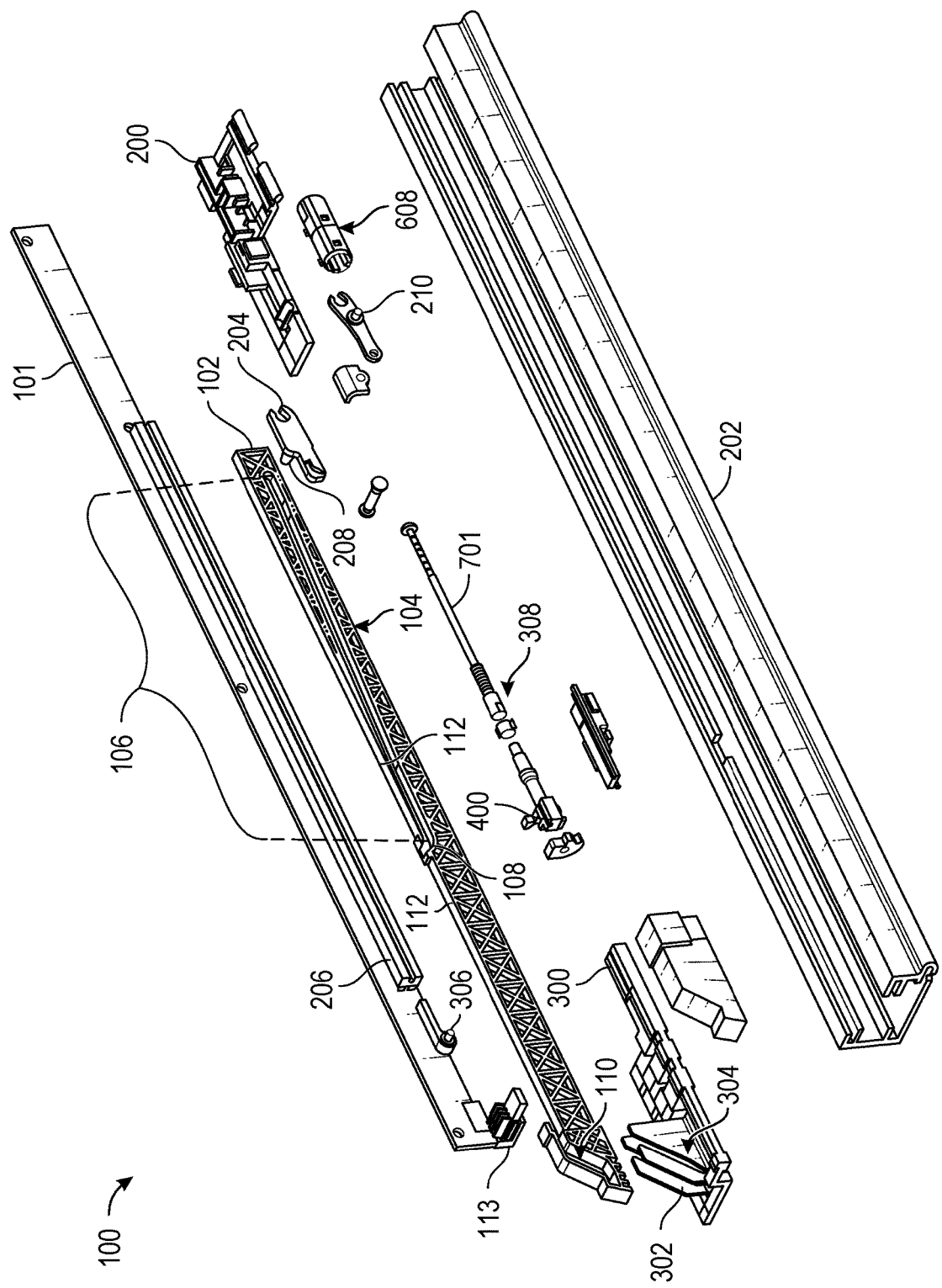
FIG. 3 is a partial view of a tilt and outer slide apparatus in accordance with an exemplary aspect of the disclosure.

FIG. 3 illustrates a tilt and outer slide apparatus 100 for a panoramic sunroof in accordance with an exemplary aspect of the disclosure. FIG. 3 shows functional components of the apparatus 100. A movable receiver bracket 101 is a functional component to which the glass panel is mounted. The glass panel of the sunroof is supported by the moveable receiver bracket 101. Also a functional bracket 206 may be mounted to the receiver bracket 101 along a lower edge of the receiver bracket 101. The functional bracket 206 may be made of metallic plate. The receiver bracket 101 is guided by a first pin 113 mounted to an end of the receiver bracket 101 and a second pin 306 mounted adjacent to an end of the functional bracket 206 at a position between the functional bracket 206 and the first pin 113. The pins 113 and 306 may be made of metal of similar material to the receiver bracket 101. The receiver bracket 101 may be made of metallic plate, of a metal such as aluminum alloy, and be of rectangular shape with a length that is at least as long as the glass panel. The first pin 113 may have a rectangular cross-section. The second pin 306 may have a circular cross-section. Components including the functional bracket 206 and pins 113 and 306 may be mounted to the metal receiver bracket, for example by a weld. The receiver bracket 101 is of minimum height to accommodate the thickness of the glass panel as well as the functional bracket 206.

The apparatus 100 includes a guide block 102. The guide block 102 is a rectangular beam that is of a length that is substantially a majority of the length of the guide rail 202 and includes guide channels formed as grooves in side surfaces of the block 102. The channels are wide enough to receive and guide pins that are part of other functional components. The guide block 102 may be made of a molded plastic.

The guide block 102 defines a first guide channel 104 that extends along a portion of a longitudinal direction of the guide block 102. The first guide channel 104 is at least as long as half of the length of the guide block 102. The first guide channel 104 facilitates tilting of the glass panel as it has an angled portion 106 that is relatively long and a curved portion 108 positioned at an end of the first guide channel and forms a continuous channel with the angled portion 106. The curved portion 108 is relatively short in length compared to the angled portion 106. The angled portion 106 is relatively straight and slopes downward from a position near a top edge at a center region of the guide block 104 to near a lower edge of the guide block 102 at an end toward a rear direction. The lower edge of the guide block 104 that the angled portion 106 comes near is a rigid support structure that prevents bending of the guide block in the vertical or upward/downward direction.

Further, the guide block 102 defines a second guide channel 110 positioned at or near an end of the guide block 104 in the forward direction and extends to a relatively long guide surface (e.g., a relative flat or even upper surface) 112. The second guide channel 110 receives the first pin 113 attached to and protruding perpendicular from an end of the receive bracket 101. The second guide channel 110 facilitates lifting of an end of the receiver bracket 101 as the receiver channel begins to move in a direction of the rear of the vehicle.

The long guide surface 112 extends away from the second guide channel 110 to an opposite end of the guide block 102. The long guide surface 112 is positioned above the first guide channel 104, and in particular above the angled portion 106 of the first guide channel 104. The long guide surface 112 extends substantially along an upper edge of the guide block 102.

The system 100 also includes a drive shoe 200 that is configured to be pulled (e.g., via a tension of a guide cable 16 affixed to the drive shoe 200) along a guide rail 202 and includes a pivot link 204 pivotably coupled thereto such that the pivot link 204 is able to pivot and/or rotate relative to the drive shoe 200. The drive shoe 200 may be made of a metallic plate with some components made of resin materials. The pivot link 204 may be made of a metallic plate. The pivot link 204 is configured to slidably couple to a functional bracket 206, which is affixed to the receiver bracket 101, to control tilting of the glass panel. The pivot link 204 may be a flat plate with a third pin 208 extending from a face of the plate. In some embodiments, the pivot link includes two separate parts, an inner part and an outer part connected to each other. The pivot link having two parts may pivot at a pair of pins protruding from rear sections of the two parts. The two parts may be spaced apart by a distance of the width of the receiver bracket 101 so that as the pivot link 204 rotates about the connecting pin, the two parts stay on either side of the receiver bracket 101 while the receiver bracket 101 is supported by a connector part that connects between the two parts. The pin 208 or pair of pins may be made of a metal that is the same as the material of the pivot link 204, with the pin 208 welded to a side surface of the metallic plate. In particular, the pivot link 204 may include a third pin 208 protruding from a surface of the pivot link 204 that slides along the first channel 104 of the guide block 102, which causes the pivot link 204 to pivot relative to the drive shoe 200.

The apparatus 100 also includes a lift guide 300 that is configured to move along the rail 202. The lift guide 300 includes a sloped bracket 302 defining an angled or slightly curved guide channel 304 into which a second pin 306 of the receiver bracket 101 extends. The lift guide 300 facilitates maintaining a position of the front of the receiver bracket 101 and/or sliding the receiver bracket 100 after the receiver bracket 100 is tilted.

Further, the apparatus 100 includes a check or locking assembly 308. The check or locking assembly 308 is configured to removably couple the drive shoe 200 and the lift guide 300 together during sunroof operation. In particular, the check assembly 308 includes a guide ramp on the drive shoe 200. The guide ramp is configured to facilitate proper locking operation of the check assembly 308 as the glass panel of the sunroof is tilting and/or sliding. The guide ramp defines a guide surface (e.g., an angled and/or curved surface) that engages at least one locking feature (for example, a protrusion having a geometric shape) of a locking component (for example, a collar) rotatably coupled to the lift guide. In other words, the shape and position of the ramp guide surface is formed to engage a locking feature of a locking portion and urge the locking component to rotate. As a result, the guide ramp aligns the locking feature(s) to an opening of a receptacle positioned proximate to the guide ramp as the drive shoe approaches the lift guide (i.e., prior to engagement of the check assembly). The shape of the locking feature is preferably of a geometric shape in which one apex is defined that will enter a narrow forward portion of the guide ramp.

Figure 4:
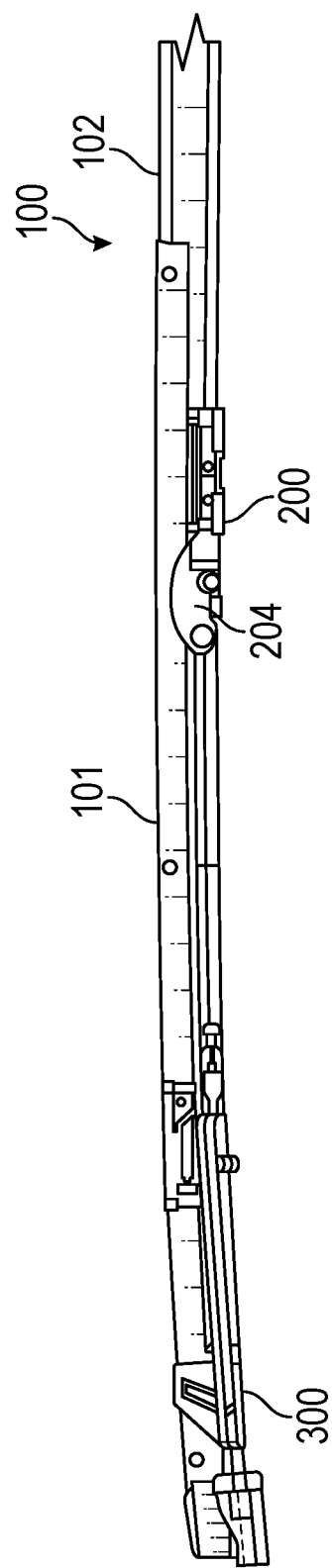
FIG. 4 is a side view of the tilt and outer slide apparatus in a closed position.

A description of the operation of the tilt and outer slide apparatus is provided next. FIG. 4 is a side view of the tilt and outer slide apparatus in a closed position. Initially, the sunroof may be assumed to be in the closed position in which the movable panel 12 is positioned within the opening 10a. The drive shoe 200 is at rest at its farthest position from the forward end of the rail 202. The pivot link 204 is at rest in a position that is the same level as the drive shoe 200. The movable receiver bracket 101 holds the movable panel 12 in a position that covers the entire opening 10a. The lift guide 300 is located in a forward position of the rail 202.

Figure 5:
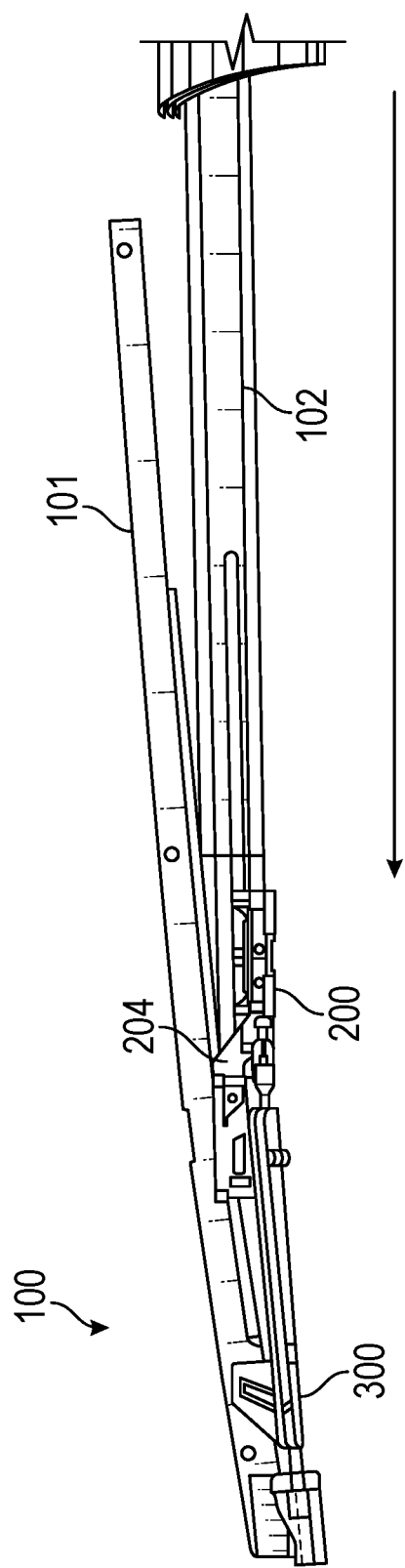
FIG. 5 is a side view of the tilt and outer slide apparatus partially tilt as it moves in a direction toward the front of the vehicle.

FIG. 5 is a side view of the tilt and outer slide apparatus partially tilt as it moves in a direction toward the front of the vehicle. To begin tilting the receiver bracket 101 (and subsequently, the movable panel 12), the drive shoe 200 moves along the rail 202 in a forward direction toward the lift guide 300 (i.e., toward a front of a vehicle). As shown in the figure, as the drive shoe 200 moves in the forward direction, the pin 208 of the pivot link 204 slides along the angled portion 106 of the first guide channel 104 to slowly tilt the receiver bracket 101 and movable panel to a first slightly tilted position.

As the drive shoe 200 continues to move in the forward direction, the pin 208 of the pivot link 204 slides along the first guide channel 104 out of an end of the curved portion 108 and, as a result, the pivot link 204 pivots relative to the drive shoe 200 to further tilt or pivot the receiver bracket 101 relative to the first pin 113 to a second partially tilted position at an tilt angle that is greater than the first tilted position. In particular, the pivot link 204 lifts a central portion of the receiver bracket 101 via the functional bracket 206.

Figure 6:
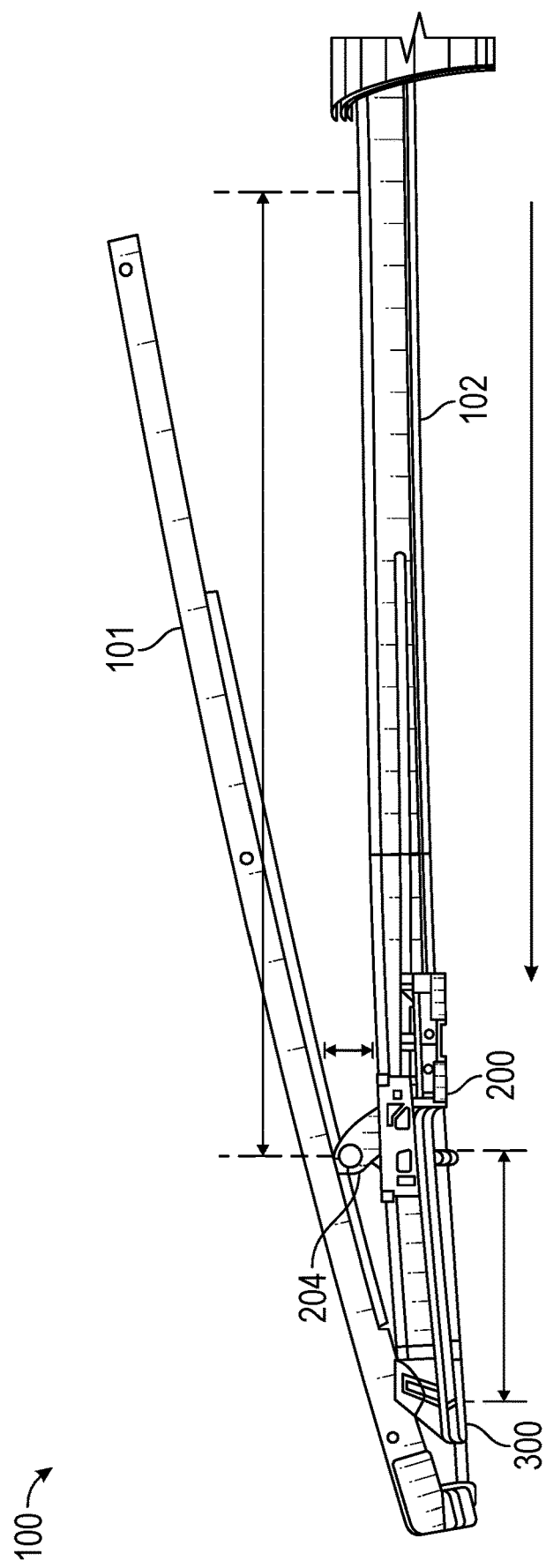
FIG. 6 is a side view of the tilt and outer slide apparatus with a drive shoe coupled to a lift guide in a fully tilted position.

FIG. 6 is a side view of the tilt and outer slide apparatus with a drive shoe coupled to a lift guide in a fully tilted position. The drive shoe 200 continues to move in the forward direction to approach the lift guide 300. When the drive shoe 200 first comes into contact with the lift guide 300, the drive shoe 200 begins to couple to the lift guide 300 via the check or lock assembly 308. Proper locking operation of the check assembly 308 requires rotation of a locking component having a locking feature and requires that the locking feature align with an opening of the receptacle while the drive shoe 200 approaches the lift guide.

Figure 7:
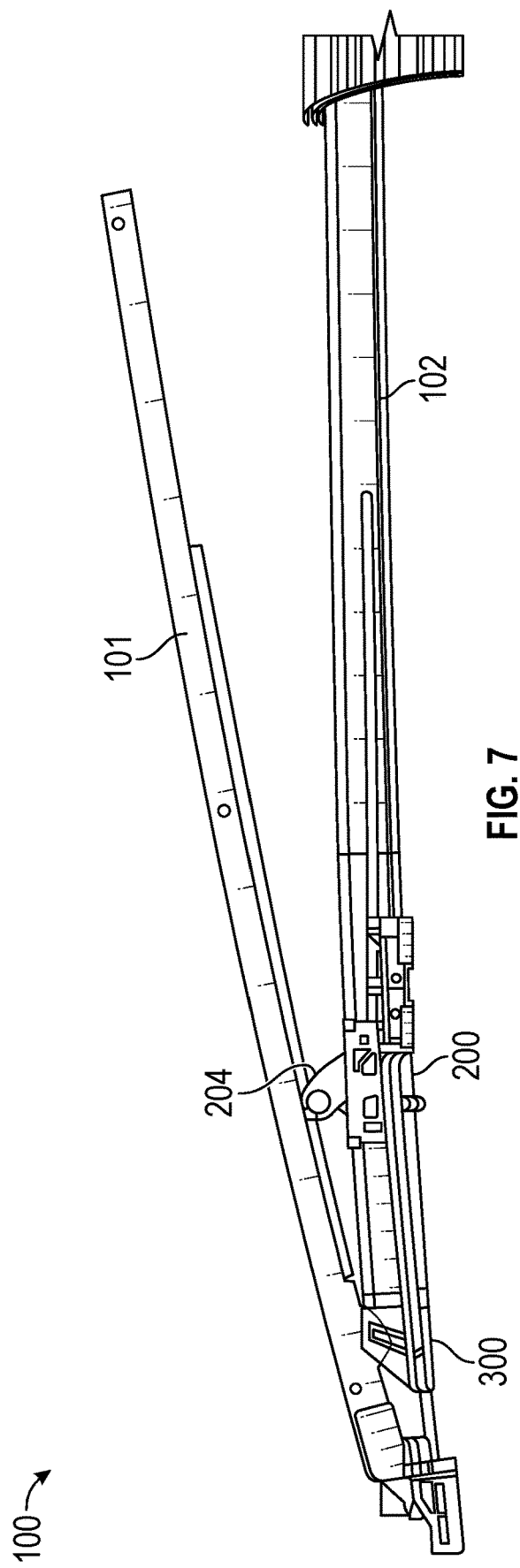
FIG. 7 is a side view of the tilt and outer slide apparatus as the drive shoe and lift guide begin to pull the receiver bracket backward.

FIG. 7 is a side view of the tilt and outer slide apparatus as the drive shoe and lift guide begin to pull the receiver bracket rearward. Regarding FIG. 7, both the drive shoe 200 and the lift guide 300 are pulled cooperatively along the guide block 102 in a rearward direction (i.e., toward a back of the vehicle) to further lift and slide the receiver bracket 101 in the fully pivoted position of the pivot link 204. The pivot link 204 remains in the fully pivoted position to maintain the receiver bracket 101 in the lifted position.

In particular, when the drive shoe 200 and the lift guide 300 begin to move in the rearward direction, the first pin 113 of the receiver bracket 101 moves along the second guide channel 110 to reach the long guide surface 112 of the guide block 102. The movement of the first pin 113 along the second guide channel 110 lifts the end of the receiver bracket 101. Then, as the drive shoe 200 and lift guide 300 continue moving in the rearward direction, the first and third pins 113, 208 slide along the long guide surface 112 and above the first guide channel 104 which provides support for the receiver bracket 101 (i.e., neither of the pins 113, 208 fall into the curved portion 108). An inner surface defined by the guide channel 304 of the lift guide bracket 302 imparts a force on the second pin 306, thereby causing the receiver bracket 101 to slide. The gradual lifting of the receiver bracket 101 as the pivot link 204 slides along the angled portion 106 in the forward direction then lifting the end of the receiver bracket 101 when the first pin 113 travels along the second guide channel enables a slow tilt rate of the receiver bracket 101.

Figure 8:
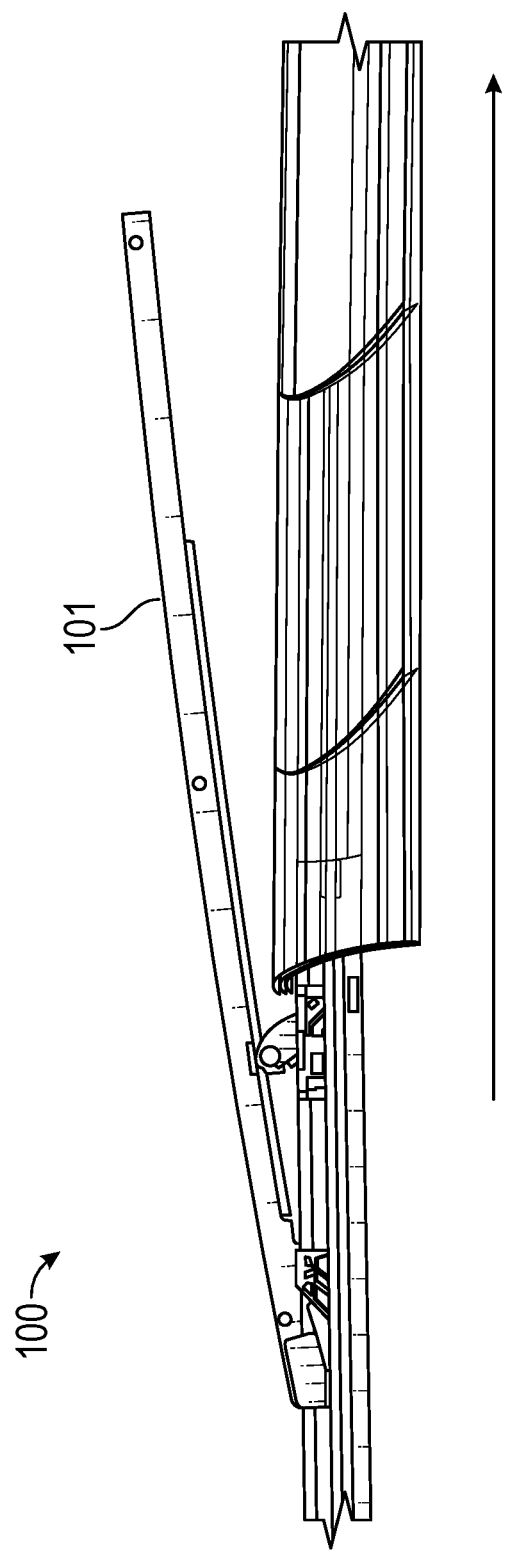
FIG. 8 is a side view of the tilt and outer slide apparatus with the receiver bracket in the open position.

FIG. 8 is a side view of the tilt and outer slide apparatus with the receiver bracket in the open position. The tilt and outer slide apparatus moves with the receiver bracket 101 and glass panel 12 in a tilted position such that the guide block 102 slides below the vehicle roof 10.

As a result, the system 100 provides a relatively long tilt-up stroke (i.e., a slow tilting rate) and slide stroke of the receiver bracket 101 via the guide block 102, the drive shoe 200, and the lift guide 300, which improves sunroof performance during high vehicle speeds as well as improves customer satisfaction. Additionally, aspects of the system 100 are adjustable to accommodate different requirements. Parameters, such as a length, an angle, a degree of curvature, of the angled portion 106 and/or the curved portion 108 of the first guide channel 104 can be changed to provide a different (e.g., longer or shorter) tilt-up stroke. Movement of the receiver bracket 101 in the rearward direction through movement of the drive shoe 200 and lift guide 300 requires that the check assembly 308 be properly locked and remain locked. Also, the check assembly 308 must be able to decouple so that the drive shoe 200 can move reward from the lift guide 300 to bring the movable panel 12 back to a closed position.

The drive shoe 200 is configured to move (e.g., via tension of a guide cable 16 coupled thereto) in a forward direction through the rail 202 toward the lift guide 300 during a glass panel tilting operation. When the drive shoe 200 reaches the lift guide 300, a check or locking system 308 temporarily couples the drive shoe 200 and the lift guide 300 together. Then, both the drive shoe 200 and the lift guide 300 are moved cooperatively along the rail 202 in a rearward direction to fully open the sunroof.

To facilitate tilting the glass panel 12 coupled to a receiver bracket 101, the pivot link 204 is pivotably coupled to the drive shoe 200 such that the pivot link 204 can pivot or rotate relative to the drive shoe 200. The pivot link 204 is also slidably coupled to a bracket 206 affixed to the receiver bracket 101. In particular, the pivot link 204 includes a first pin 208 and a second pin 210 coupled to opposite sides of the pivot link 204. The first pin 208 is configured to slide through a first guide channel 104 formed by a relatively long guide block 102. As the first pin 208 moves through the first guide channel 104, an angled surface defined by the first guide channel 104 imparts a force on the first pin 208 to cause the pivot link 204 to begin pivoting, thereby tilting the glass panel.

Figure 9:
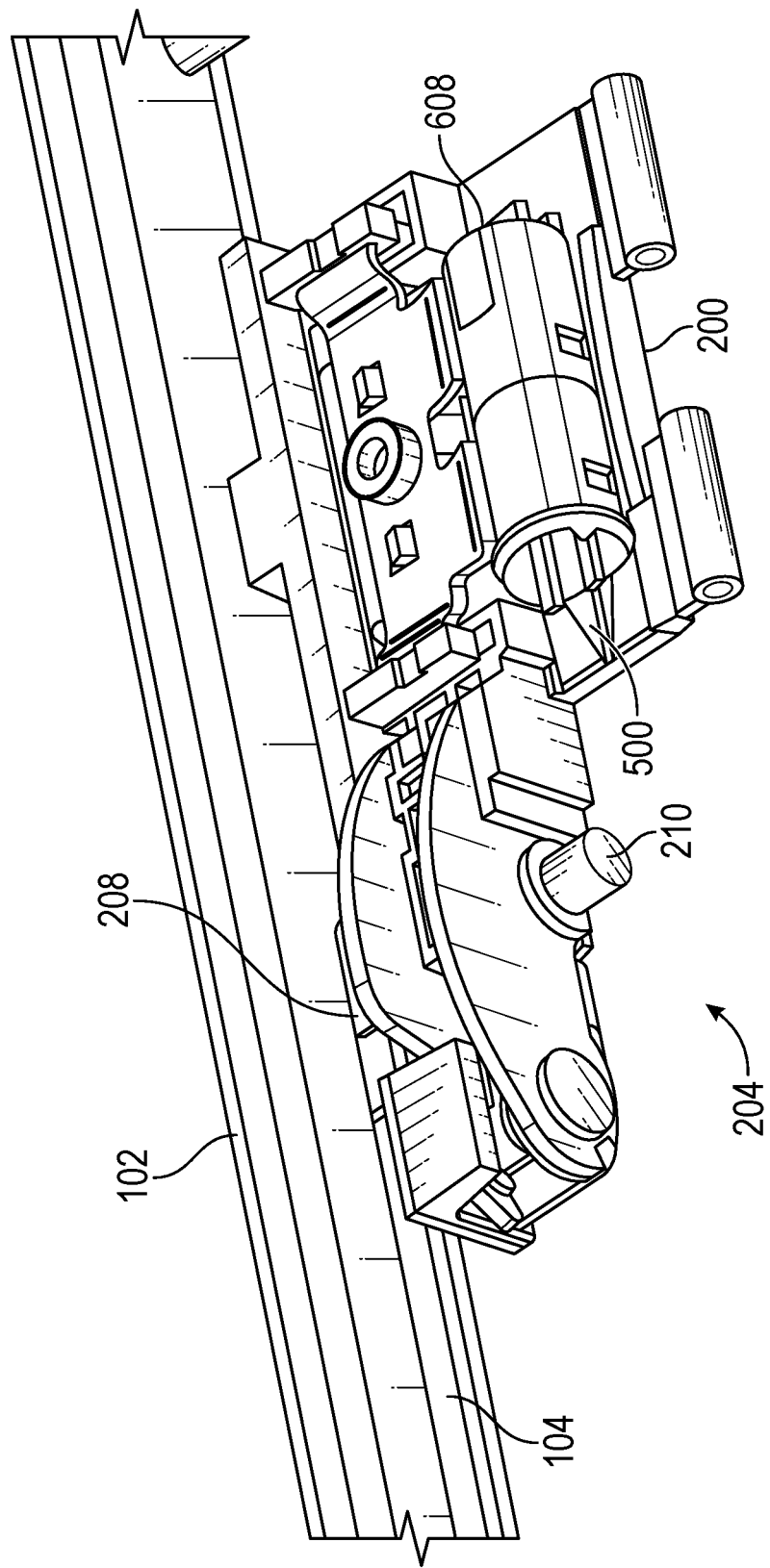
FIG. 9 is a perspective view of the pivot link, drive shoe and receptacle.

Details of the pivot link will be described next in relation to a mechanical lock and receptacle of the check assembly 308. FIG. 9 is a perspective view of the pivot link, drive shoe and receptacle. The drive shoe 200 is configured to move parallel to the guide block 102 in a direction toward the lift guide 300. A receptacle 608 of the check assembly 308 is mounted to the drive shoe 200 and is configured to receive a pin of the check assembly 308 (see 701 in FIG. 11) by way of an opening at a forward face of the receptacle 608. The receptacle 608 may be placed on the drive shoe 200 to position the opening of the receptacle in a vertical position and a horizontal position. The drive shoe 200 includes a rigid body that is set reward of the pivot link 204 to support the pivot link 204 and the receptacle 608 as the drive shoe 200 is guided by the rail 202.

The pivot link 204 may have two opposing plates that may include a first pivot pin 208 and a second pivot pin 210 protruding from opposite sides of the pivot link 204. The first pivot pin 208 is configured to slide along a first guide channel 104 formed in the relatively long guide block 102. The second pivot pin 210 slides in a mechanical lock of the check assembly 308, and will be described next.

Figure 10:
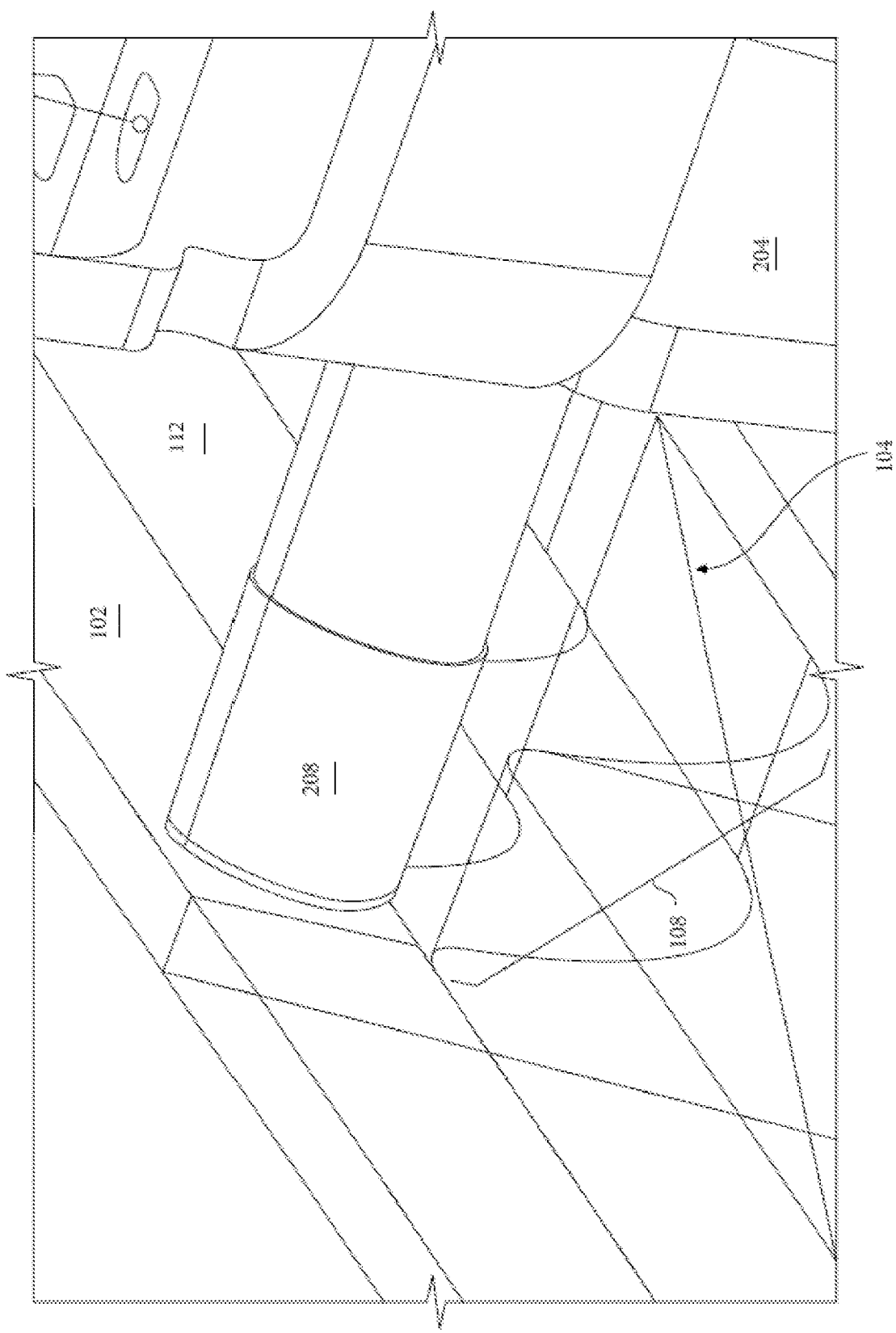
FIG. 10 is a perspective view of a pivot link.

FIG. 10 is a perspective view of a pivot link. Regarding FIG. 10, a curved surface 108 defined by an end of the first guide channel 104 urges the first pivot pin 208 out of the first channel 104 before the drive shoe 200 temporarily couples to the lift guide 300 via the check system 308. Referring back to FIG. 3, the end of the first guide channel 104 where the curved surface 108 is located is approximately in the center of the guide block 102. The curved surface 108 may be rounded or may be a straight surface having a steep slope, for example a slope of approximately 45 degrees. The rounded or sloped surface of the curved surface 108 may be formed upward from a rearward end toward a front end of the guide block 102. In this manner, the pivot link 204 pivots from a lowered position to a raised position. Then, when the drive shoe 200 and the lift guide 300 move cooperatively in the rearward direction, the first pivot pin 208 slides against an upper surface 112 defined between ends of the guide block 102.

Figure 11:
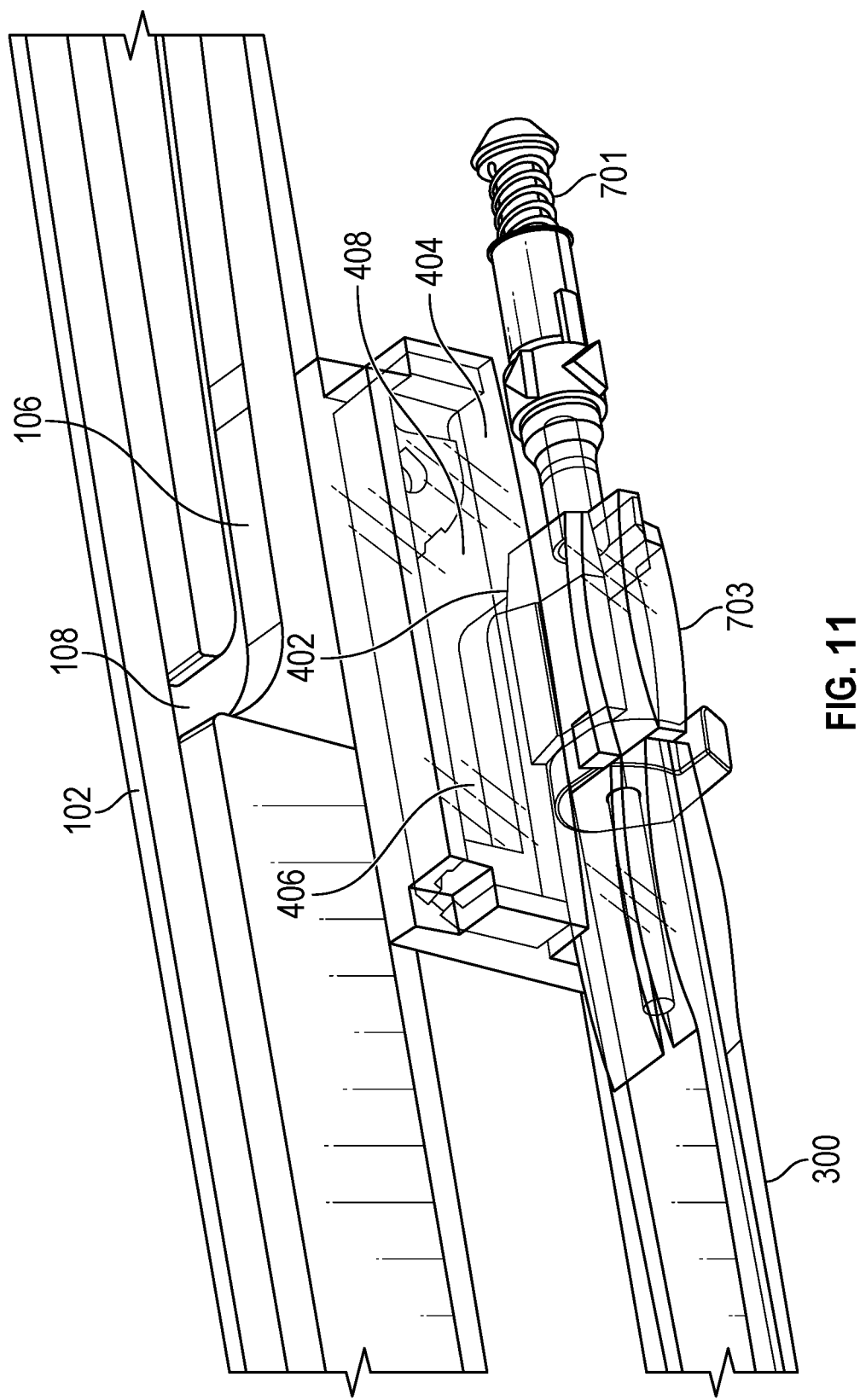
FIG. 11 is a perspective view of a check assembly and lift guide.

To prevent the first pivot pin 208 from entering the first channel 104 when the drive shoe 200 and the lift guide 300 are cooperatively moved together, the lift guide 300 is maintained in a locked position by a mechanical lock 400 component of the check assembly 308. FIG. 11 is a perspective view of a check assembly and lift guide. The mechanical lock 400 is mounted to the lift guide 300 and includes a portion 703 through which a pin 701 extends through. The mechanical lock 400 includes an inner surface defining a second guide channel 402 to receive the second pivot pin 210. The length of the mechanical lock 400 is approximately the length of the pivot link 204 as it is primarily for supporting and locking the pivot link 204. In particular, the second guide channel 402 includes a lower guide portion 404, an upper guide portion 406, and a curved guide portion 408 interposed between the lower and upper portions 404, 406. The lower and upper guide portions 404, 406 may each be horizontal. The curved guide portion 408 may be a steep angled portion, for example about 45 degrees. The second guide channel 402 is sufficiently sized to handle the motion of the pivot link 204 as it pivots from a lower position to a raised position.

Figure 12A:
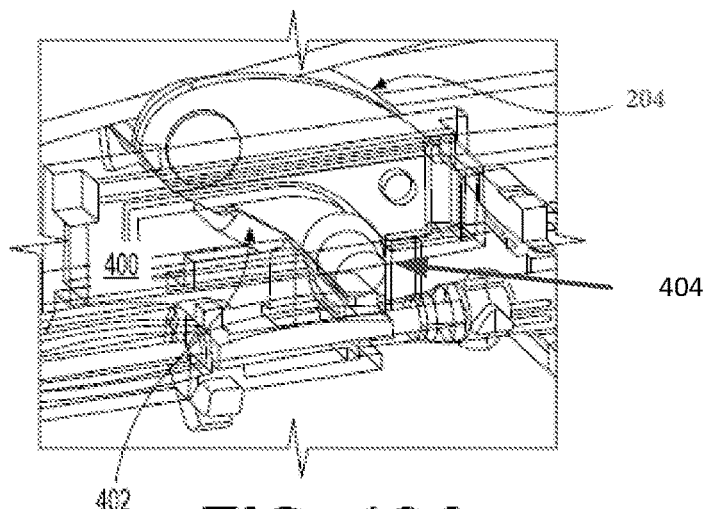
FIGS. 12A, 12B, 12C are perspective views of a pivot link as a pin moves through a guide channel.
Figure 12B:
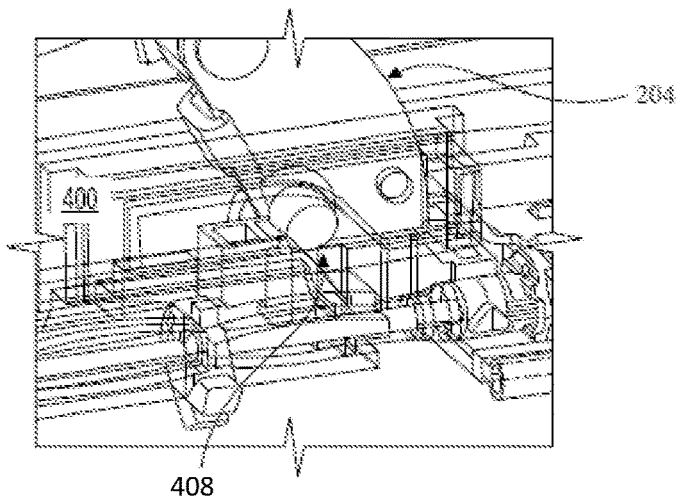
Figure 12C:
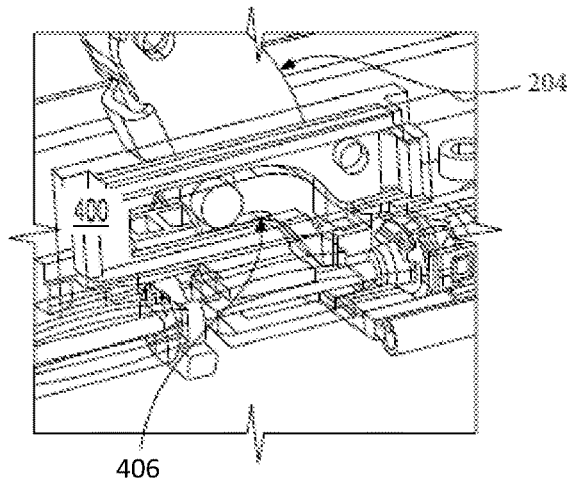

Operation of the mechanical lock 400 is described next. In FIG. 12A, as the drive shoe 200 reaches or is approaching the lift guide 300, the second pivot pin 210 enters the lower guide portion 404 of the second channel 402. Further, in FIG. 12B, as the curved surface 108 of the first channel 104 causes the pivot link 204 to pivot to the raised position, the second pivot pin 210 moves through the curved portion 408. In FIG. 12C, the second pivot pin 210 moves out of the curved portion 408 to the upper portion 406. Also, curved portion 408 causes pivoting alongside curved surface 108 during movements described in FIG. 5 and FIG. 6. However, the curved surface 108 is the main driver of tilting function in FIGS. 6 and 7. In addition, curved portion 408 follows this motion curvature with extra offset due to tolerance. Subsequently, the curved portion 408 ensures the function of the sunroof during closing, such as from FIG. 6 to FIG. 5 and then FIG. 4. That is, the curved portion 408 of the mechanical lock 400 does not cause the pivot link 204 to pivot but only enables the second pivot pin 210 to reach the upper guide portion 406. Subsequently, when the drive shoe 200 is temporarily coupled to the lift guide 300 (i.e., the check system 308 is engaged), a surface defined by the upper guide portion 406 of the second channel 402 engages the second pivot pin 210 to lock the pivot link 204 in the raised position and/or otherwise maintain an orientation of the pivot link 204 (i.e., the pivot link 204 is locked in a Z-direction).

Figure 13:
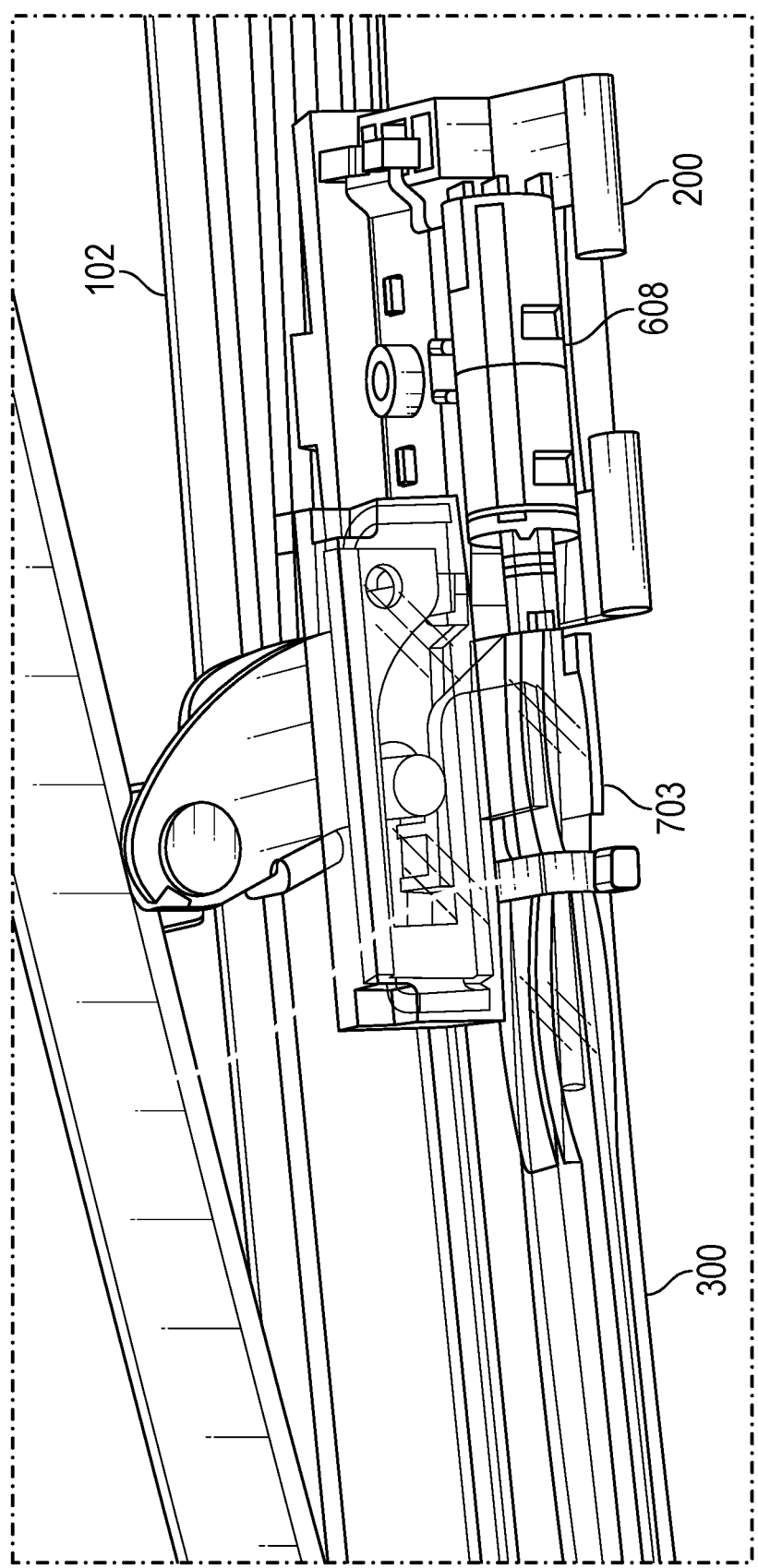
FIG. 13 is a perspective view of a drive shoe and lift gate coupled together via the check assembly.

Subsequently, in FIG. 13, as the drive shoe 200 and the lift guide 300 are moved cooperatively in the rearward direction, the first pivot pin 208 is prevented from entering the first guide channel 104 until the check system 308 decouples the drive shoe 200 from the lift guide 300. At a time when the drive shoe 200 is decoupled from the lift guide 300 (i.e., the check system 308 is disengaged), the pivot link 204 moves relative to the mechanical lock 400 such that the first pivot pin 208 is allowed to enter the first guide channel 104 as the pivot link 204 pivots back to the lowered position. As the first pivot pin 208 enters the first guide channel 104, the second pivot pin 210 is then allowed to move from the upper portion 406 to the lower portion 404.

Figure 14:
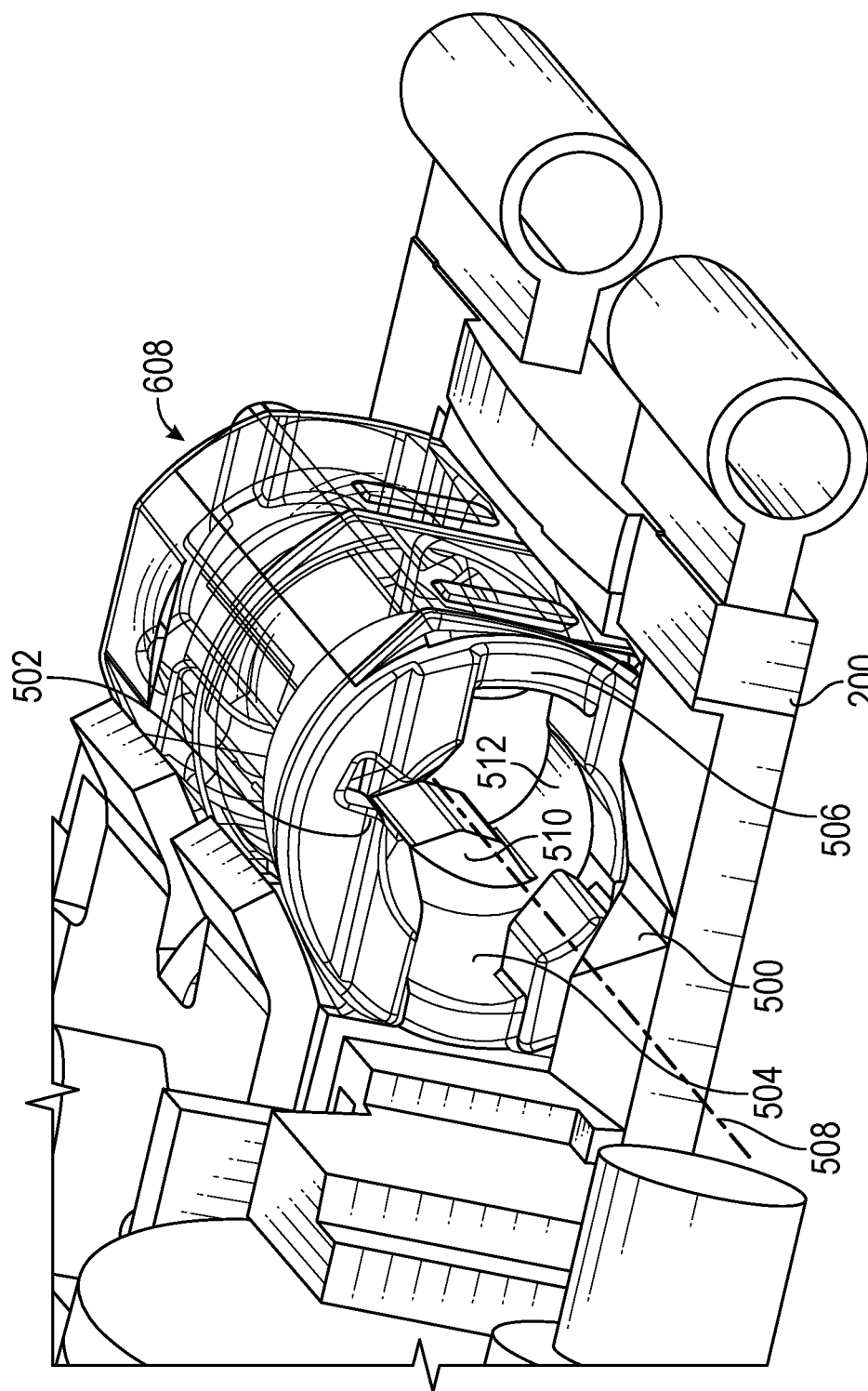
FIG. 14 is a perspective view of a guide ramp and a receptacle of the check assembly.

Next, further description is provided for the check assembly 308. FIG. 14 is a perspective view of a guide ramp and a receptacle of the check assembly. The check assembly 308 may include a guide ramp 500 that is coupled to and/or formed in the drive shoe 200 and positioned proximate to a front opening 502 of the receptacle 608. The guide ramp 500 defines an angled and/or curved indented surface configured to engage a portion of a locking component (for example, a collar) 600 positioned over the pin 701. The receptacle 608 may be cylindrical with a cylindrical hollow passage through its center. An entrance in the forward direction may be a circular plate with a slotted opening 502. The slots, or recessed areas, in the opening 502 may be of a shape that approximately matches a locking feature of pin 701 with a sufficient tolerance to allow smooth entry of the locking feature through the recessed areas. The opening of the circular plate has a diameter that is smaller than the diameter of the hollow passage such that after the locking feature of the pin 701 passes through the slotted opening 502 and a groove of the locking component 600 further rotates the locking component 600 and the pin 701 is locked and prevented from exiting the slotted opening 502. In order to decouple the check assembly from the locked position, the locking component 600 must again be rotated by the groove to the orientation where the locking features are positioned coincident with the slots, recessed areas, of the slotted opening.

Figure 15:
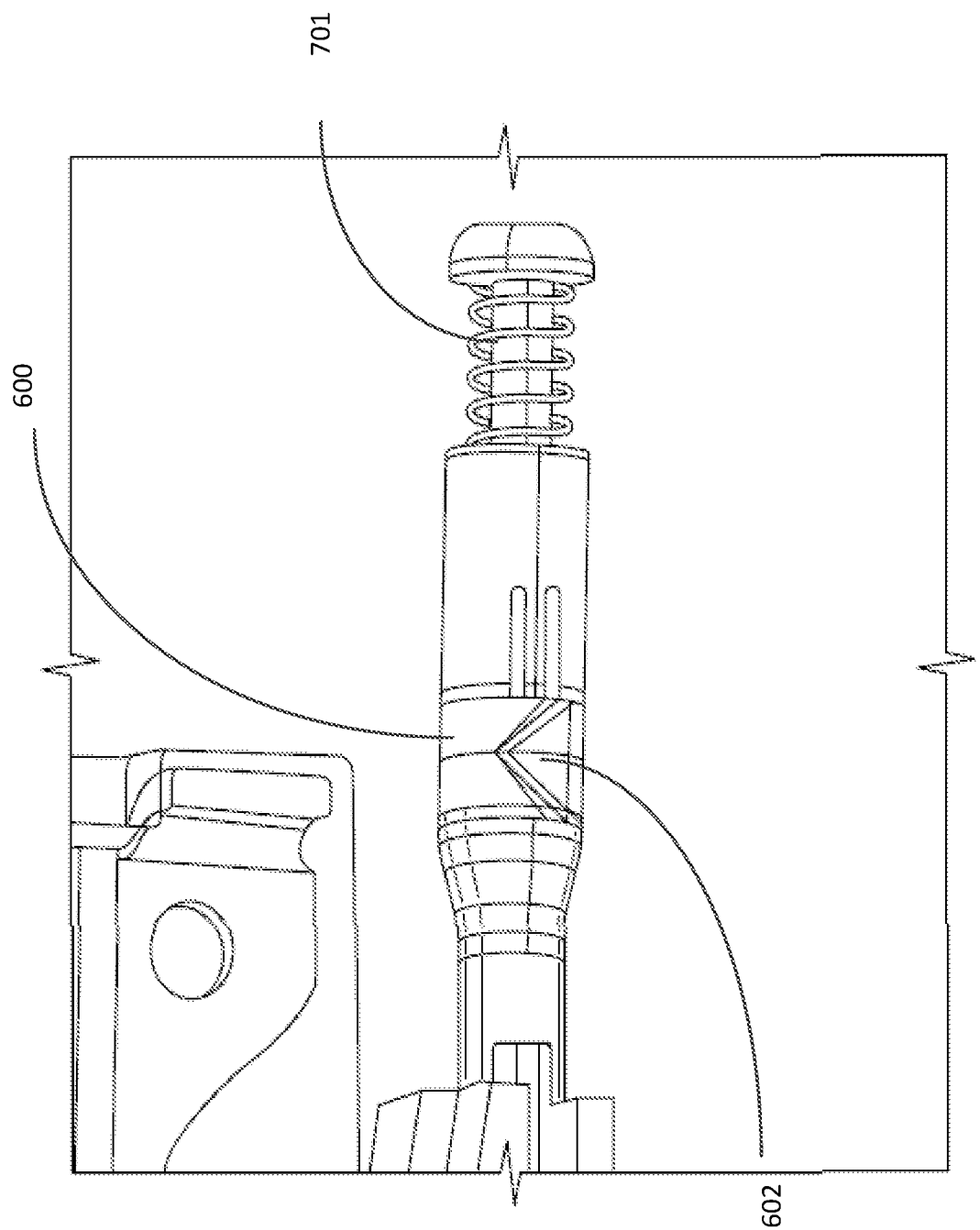
FIG. 15 is a side view of a locking component of the check assembly.

In some embodiments, the locking component 600 may include two opposing locking features (for example, two opposing protrusions having a particular geometry) 602, one of which is shown in FIG. 15. Although the locking features are opposing protrusions, other positions of locking features are possible. In some embodiments, the slots, recessed areas, must be clear of the guide ramp 500, and the locking features must be arranged to be consistent with the position of the slots. The pin 701 may include a spring located forward of a capped end of the pin such that when the pin 701 passes into the hollow passage of the receptacle 608 and reaches an inner end surface of the receptacle in the rearward direction, contraction of the pin when the cap portion comes in contact with the inner end forces the pin to maintain a lock position. Also, the hollow passage is formed with the groove on the inner surface of the receptacle 608 to urge the locking features 602 to rotate the locking component 600 into a lock position as it passes into the hollow passage. In some embodiments, the opposing protrusions 602 are triangular shaped protrusions formed on the cylindrical surface of the locking component 600 with all three apexes fixed to the surface. The protrusions 602 may also have curved edges instead of straight sides forming a triangular shape. The triangular shape of the protrusions 602 may be for a right triangle, or may be shaped with smaller angles than a right triangle at two apexes. Other shapes of the protrusions are possible, such as square, rectangular, pentagon, or other geometric shapes. The locking features 602 engage the groove defined by an inner surface of the receptacle 608, thereby providing coupling and decoupling functionality for the drive shoe 200 and the lift guide 300. To properly function, the locking features 602 need to pass through respective recessed areas 504, 506 defined by the opening 502. In one embodiment, the recessed areas 504, 506 are horizontally aligned and extend opposite to each other radially outward relative to an axis 508 of the opening 506.

More particularly, the guide ramp 500 is sized, shaped, structured, and/or otherwise configured to urge the locking component 600 to rotate as at least one of the locking features 602 slide against the guide ramp 500, thereby causing the locking features 602 to align to and/or pass through respective ones of the recessed areas 504, 506. For example, the locking features may initially be oriented in a vertical direction (i.e., an improper orientation), in which case the guide ramp 500 causes the locking features 602 to rotate to a horizontal orientation (i.e., a proper orientation) as the pin 701 enters the opening 502.

Figure 16:
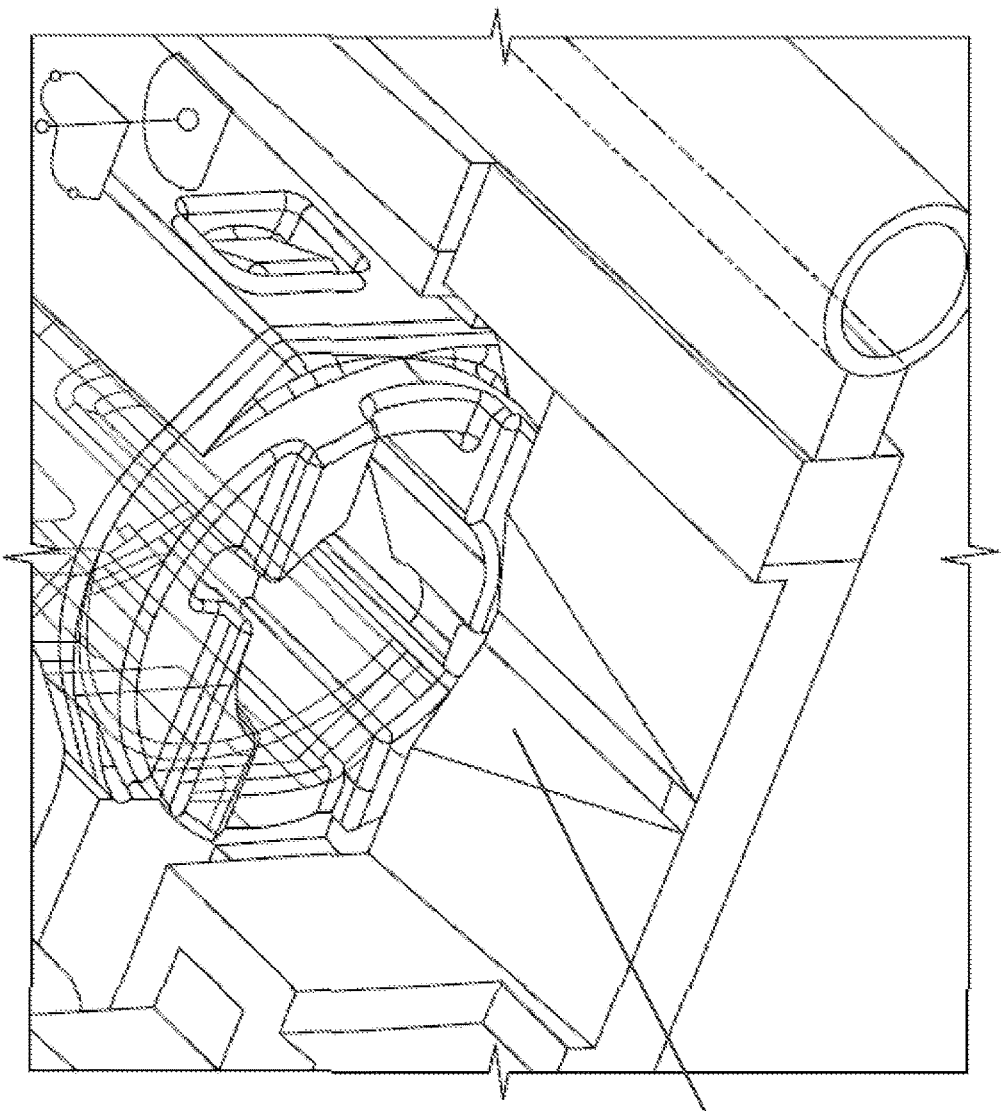
FIG. 16 is perspective view of the guide ramp of the check assembly.

FIG. 16 is perspective view of the guide ramp of the check assembly. In some embodiments, the guide ramp 500 may be formed as a tapered groove in which a distance in the width direction is continuously broadened (i.e., flares out) from a front end of the groove at a forward edge of the drive shoe toward a rear end of the groove and is sloped downward into a surface of the guide shoe 200 from the front end toward a rear end. Provided locking features 602 having triangular shapes, when an apex of one of the locking features 602 enters the tapered groove 500 the locking component 600 will be urged to rotate to a position in which the locking features 602 are in a horizontal orientation enabling them to pass through respective recessed areas 504, 506 defined by the opening 502.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A tilt and slide apparatus for a sunroof of a vehicle, comprising:
    a movable panel configured to open and close an opening formed at a roof of the vehicle;
    a receiver bracket affixed to the movable panel;
    a guide block having a first guide channel, the first guide channel extends in a length direction of the guide block;
    a drive shoe configured to slide in a forward and rearward direction of the vehicle;
    a pivot link pivotally coupled to the drive shoe, the pivot link having a first pivot pin configured to slide along the first guide channel of the guide block to control tilting of the movable panel as the drive shoe slides in the forward direction;
    a lift guide connected to an end of the movable panel for maintaining a position of the front of the receiver bracket; and
    a check assembly including a mechanical lock mounted to the lift guide,
    wherein the mechanical lock includes an inner surface having a locking guide channel to guide a second pivot pin of the pivot link, the locking guide channel includes an upper guide portion,
    wherein the pivot link is configured to pivot to a raised position to tilt the movable panel when the drive shoe is slid in the forward direction and becomes coupled to the lift guide by the check assembly, and
    wherein the upper guide portion engages the second pivot pin to lock the pivot link in the raised position.

2. The tilt and slide apparatus of claim 1, wherein the check assembly includes a locking component,
    wherein the check assembly is configured to align a portion of the locking component in order to couple the drive shoe and the lift guide.

3. The tilt and slide apparatus of claim 2, wherein the check assembly includes a receptacle mounted to the drive shoe, and
    wherein a ramp of the check assembly is configured to urge the locking component into alignment with the receptacle.

4. The tilt and slide apparatus of claim 3, wherein the ramp of the check assembly is configured to urge the locking component by rotating the locking component as it approaches and enters a front of the receptacle into an orientation in which the locking component is properly aligned with the receptacle.

5. The tilt and slide apparatus of claim 4, wherein the receptacle is cylindrical with a cylindrical hollow passage through its center, and
    wherein the receptacle includes a groove.

6. The tilt and slide apparatus of claim 1, wherein the locking guide channel of the mechanical lock includes a lower guide portion and a curved guide portion interposed between the lower and upper guide portions, and
    wherein the lower guide portion is configured to receive the second pivot pin as the drive shoe approaches the lift guide.

7. The tilt and slide apparatus of claim 1, wherein the first guide channel includes a curved surface at an end of the first guide channel,
    wherein the curved surface of the first guide channel is configured to cause the pivot link to pivot to the raised position, and
    wherein the pivoting of the pivot link by the curved surface causes the second pin to move through the curved guide portion of the locking guide channel, then move out of the curved guide portion to the upper guide portion.

8. The tilt and slide apparatus of claim 7, wherein the check assembly includes a rotatable locking component and a fixed receptacle,
    wherein a ramp of the check assembly is configured to urge the locking component into alignment with the receptacle.

9. The tilt and slide apparatus of claim 1, wherein the check assembly is configured to maintain the drive shoe and the lift guide in a coupled state while the pivot link is locked in the raised position in order to facilitate sliding of the movable panel in a rear direction opposite the forward direction.

10. The tilt and slide apparatus of claim 1, wherein the check assembly is configured to decouple the drive shoe from the lift guide, and wherein when the drive shoe is decoupled from the lift guide, the first pivot pin is allowed to re-enter the first guide channel, enabling the second pivot pin to move from the upper guide portion to a lower guide portion of the locking guide channel.

11. A method for a tilt and slide apparatus for a sunroof of a vehicle, the tilt and slide apparatus including a guide block having a first guide channel, the first guide channel extends in a length direction of the guide block, a drive shoe configured to slide, a pivot link pivotally coupled to the drive shoe, the pivot link having a first pivot pin and a second pivot pin opposite of the first pivot pin, a lift guide, and a check assembly including a mechanical lock mounted to the lift guide, the mechanical lock including an inner surface having a locking guide channel, the locking guide channel including an upper guide portion, the method comprising:

sliding the drive shoe in the forward direction to the lift guide;
sliding the pivot link via the first pivot pin along the first guide channel;
guiding the second pivot pin along the locking guide channel;
pivoting the pivot link to a raised position to tilt a movable panel;
the check assembly coupling the drive shoe and the lift guide; and
engaging the second pivot pin by the upper guide portion to lock the pivot link in the raised position.

12. The method of claim 11, wherein the check assembly includes a locking component, wherein the coupling of the drive shoe and the lift guide includes aligning a portion of the locking component.

13. The method of claim 12, wherein the check assembly includes a receptacle mounted to the drive shoe, and wherein a ramp of the check assembly urges the locking component into alignment with the receptacle.

14. The method of claim 13, wherein the ramp rotates the locking component as it approaches and enters a front of the receptacle into an orientation in which the locking component is properly aligned with the receptacle.

15. The method of claim 14, wherein the receptacle is cylindrical with a cylindrical hollow passage through its center.

16. The method of claim 11, wherein the locking guide channel of the mechanical lock includes a lower guide portion and a curved guide portion interposed between the lower and upper guide portions, and wherein engaging includes the lower guide portion receiving the second pivot pin as the drive shoe approaches the lift guide.

17. The method of claim 11, wherein the first guide channel includes a curved surface at an end of the first guide channel, wherein the pivoting includes pivoting the pivot link to the raised position by way of the curved surface of the first guide channel, and
wherein the pivoting of the pivot link by the curved surface causes the second pin to move through the curved guide portion of the locking guide channel, then move out of the curved guide portion to the upper guide portion.

18. The method of claim 17, wherein the check assembly includes a rotatable locking component and a fixed receptacle, wherein the coupling by the check assembly includes urging the locking component into alignment with the receptacle using a ramp of the check assembly.

19. The method of claim 11, further comprising maintaining the drive shoe and the lift guide in a coupled state while the pivot link is locked in the raised position while sliding the movable panel in a rear direction opposite the forward direction.

* * * * *